US012739770B2

(12) United States Patent
Lu et al.

(10) Patent No.: US 12,739,770 B2
(45) Date of Patent: Sep. 15, 2026

(54) NETWORK SELECTION METHOD, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventors: Fei Lu, Dongguan (CN); Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 523 days.

(21) Appl. No.: 18/145,921

(22) Filed: Dec. 23, 2022

(65) Prior Publication Data

US 2023/0199691 A1 Jun. 22, 2023

Related U.S. Application Data

(63) Continuation of application No. PCT/CN2020/118556, filed on Sep. 28, 2020.

(51) Int. Cl.
*H04W 60/00* (2009.01)

(52) U.S. Cl.
CPC .................................. *H04W 60/00* (2013.01)

(58) Field of Classification Search
CPC ..... H04W 60/00; H04W 60/06; H04W 48/18; H04W 84/06; H04W 60/02; H04W 60/005; H04W 60/04; H04W 84/042
See application file for complete search history.

(56) References Cited

U.S. PATENT DOCUMENTS

| | | | | |
|---|---|---|---|---|
| 10,609,667 | B1 | 3/2020 | Cakulev et al. | |
| 2015/0005033 | A1 | 1/2015 | Petersson et al. | |
| 2020/0187144 | A1 | 6/2020 | Ying et al. | |
| 2020/0245283 | A1 | 7/2020 | Cakulev et al. | |
| 2021/0144539 | A1* | 5/2021 | Edge | H04W 84/042 |
| 2022/0046424 | A1* | 2/2022 | Edge | H04W 12/63 |

FOREIGN PATENT DOCUMENTS

| | | | |
|---|---|---|---|
| CN | 107820313 | A | 3/2018 |
| CN | 108012310 | A | 5/2018 |
| CN | 109548099 | A | 3/2019 |
| CN | 110798877 | A | 2/2020 |
| CN | 111148212 | A | 5/2020 |

(Continued)

OTHER PUBLICATIONS

First Office Action of the Chinese application No. 202310334093.0, issued on Jul. 30, 2024. 15 pages with English translation.

(Continued)

*Primary Examiner* — Marcus Hammonds
(74) *Attorney, Agent, or Firm* — ASHURST PERKINS COIE US LLP

(57) ABSTRACT

Network selection methods, a UE and a core network element are provided. A network selection method includes that: after initiating a registration process for a first network, a UE receives first information sent by a core network element, the first information including area information of the UE; and the UE determines a target network on the basis of the first information.

20 Claims, 6 Drawing Sheets

(56) References Cited

FOREIGN PATENT DOCUMENTS

| CN | 111713128 A | 9/2020 |
|---|---|---|
| WO | 2018082673 A1 | 5/2018 |
| WO | 2022031524 A1 | 2/2022 |

OTHER PUBLICATIONS

Ericsson, "(TP to TS 38.856) Positioning Server Functionality and the NG-RAN", 3GPP TSG-RAN WG3 #106 R3-197790, Reno, NV, USA, Nov. 18-22, 2019, pp. 1-2.
First Office Action of the Japanese application No. 2023-512015, issued on Jul. 12, 2024. 6 pages with English translation.
Second Office Action of the European application No. 20954775.1, issued on Aug. 8, 2024. 6 pages.
3GPP TR 23.737 v17.1.0 (Jul. 2020), 3rd Generation Partnership Project; Technical Specification Group Services and System Aspects; Study on architecture aspects for using satellite access in 5G (Release 17), pp. 1-92, XP051924392, p. 64, section 6.12.2.6 Initial PLMN Access-p. 66, section 6.12.2.6 Initial PLMN Access; figures 6.12.2.6-1, p. 71, section 6.13.2 Procedures-p. 74, section 6.13.4 Solution evaluation. 92 pages.
Nokia et al: "New solution for the PLMN selection part of Key Issue #10", 3GPP Draft; S2-1912523, 3rd Generation Partnership Project (3GPP), MobileCompetence Centre ; 650, Route Des Lucioles; F-06921 Sophia-Antipolis Cedex; France vol. SA WG2, no. Reno NV, USA; Nov. 18, 2019-Nov. 22, 2019 Nov. 22, 2019 (Nov. 22, 2019), XP051828440, the whole document. 4 pages.
Ericsson et al: "Sol#13: Additional description and evaluation of Solution #13", 3GPP Draft; S2-2003687, 3rd Generation Partnership Project (3GPP), Mobile Competence Centre; 650, Route Des Lucioles; F-06921 Sophia-Antipolis Cedex; France vol. SA WG2, no. Elbonia; Jun. 1, 2020-Jun. 12, 2020 May 22, 2020 (May 22, 2020), XP051889730, the whole document. 5 pages.
Supplementary European Search Report in the European application No. 20954775.1, mailed on Jul. 26, 2023. 17 pages.
First Office Action of the Indian application No. 202327013805, issued on Aug. 21, 2023. 5 pages with English translation.
First Office Action of the European application No. 20954775.1, issued on Feb. 8, 2024. 10 pages.
Nokia et al. "Introduction of 5GSAT_Arch solution #13 to NAS procedure" 3GPP TSG-SA WG2 Meeting #140E S2-2005494, Elbonia, Aug. 19-Sep. 1, 2020, (Revision of S2-200xxxx). 29 pages.
Nokia et al. "TP for NR BL CR for TS 38.413): Correction of signalled Allowed NSSAI" 3GPP TSG-RAN WG3#101 R3-184431, Gothenburg, Sweden, Aug. 20-24, 2018, Agenda item: 31.3.4.4. 4 pages.
International Search Report in the international application No. PCT/CN2020/118556, mailed on Jun. 24, 2021. 6 pages with English translation.
Written Opinion of the International Search Authority in the international application No. PCT/CN2020/118556, mailed on Jun. 24, 2021. 7 pages with English translation.

* cited by examiner

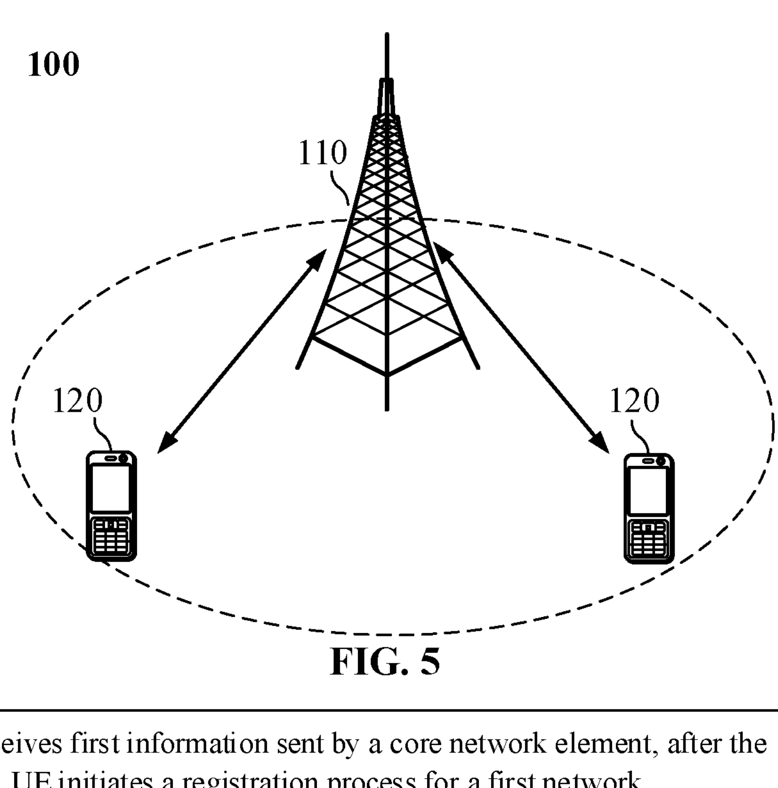
FIG. 5
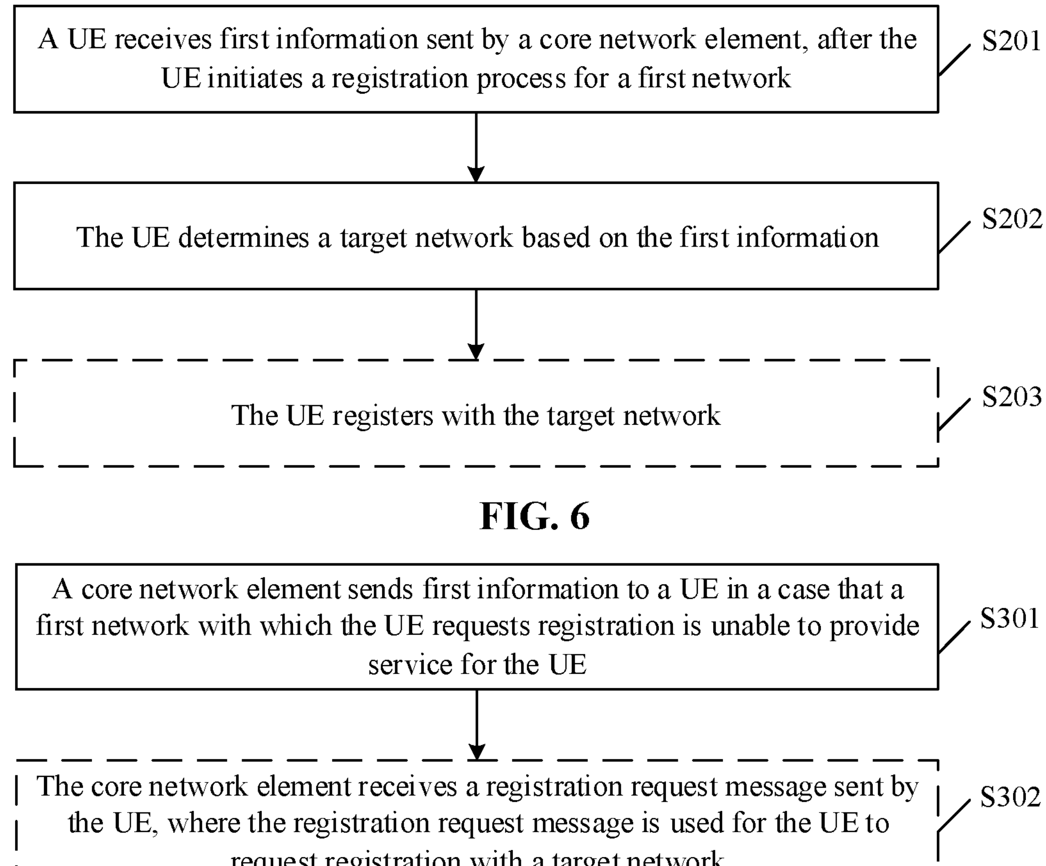
FIG. 6
FIG. 7

NETWORK SELECTION METHOD, ELECTRONIC DEVICE, AND STORAGE MEDIUM

CROSS-REFERENCE TO RELATED APPLICATION(S)

This application is a continuation of International Patent Application No. PCT/CN2020/118556 filed on Sep. 28, 2020, the entire contents of which are incorporated by reference herein in its entirety.

BACKGROUND

In a New Radio (NR) system, after User Equipment (UE) registers with a network, there may be a situation that the network with which the UE registers is unable to provide service for the UE. Therefore, how to quickly register with an available network by the UE is a goal that has been pursued all the time.

SUMMARY

Embodiments of the present disclosure relate to the field of wireless communication technologies, and provide a network selection method, a UE and a core network element.

In the first aspect, embodiments of the disclosure provide a network selection method including the following operations.

A UE receives first information sent by a core network element after the UE initiates a registration process for a first network. Herein, the first information includes area information of the UE.

The UE determines a target network based on the first information.

In a second aspect, embodiments of the present disclosure provide a network selection method including the following operations.

A core network element sends first information to a UE in a case that a first network with which the UE requests registration is unable to provide service for the UE.

Herein, the first information includes area information of the UE, and the first information is used for the UE to register with a target network.

In a third aspect, embodiments of the present disclosure provide a UE including a processor, a network interface, and a memory for storing computer programs that, when executed by the processor, cause the processor to: receive, through the network interface, first information sent by a core network element after the UE initiates a registration process for a first network, here, the first information includes area information of the UE; and determine a target network based on the first information.

In a fourth aspect, embodiments of the present disclosure provide a core network element including a processor, a network interface, and a memory for storing computer programs that, when executed by the processor, cause the processor to: send, through the network interface, first information to User Equipment (UE) in a case that a first network with which the UE requests registration is unable to provide service for the UE. Here, the first information includes area information of the UE, and the first information is used for the UE to register with a target network.

BRIEF DESCRIPTION OF THE DRAWINGS

FIG. 5 is a structural diagram of a communication system according to an embodiment of the present disclosure.

FIG. 6 is a flowchart of a process of a network selection method performed by a UE according to an embodiment of the present disclosure.

FIG. 7 is a flowchart of a process of a network selection method performed by a core network element according to an embodiment of the present disclosure.

DETAILED DESCRIPTION

Figure 1:
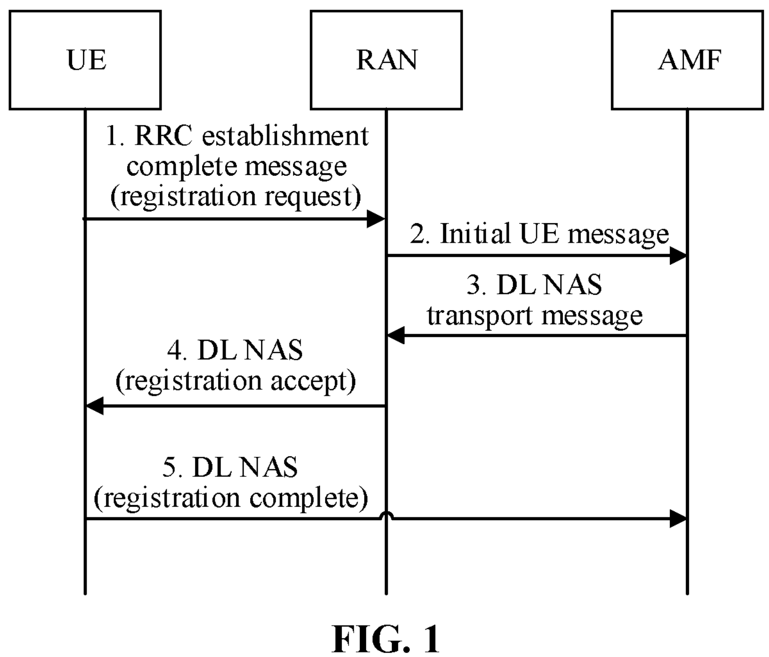
FIG. 1 is a flowchart of network registration according to an embodiment of the present disclosure.

In order to understand the characteristics and technical contents of the embodiments of the present disclosure in more detail, the implementations of the embodiments of the present disclosure will be described in detail below with reference to the accompanying drawings, which are provided for illustration only and are not intended to limit the embodiments of the present disclosure.

Before the detailed description of network selection methods provided by the embodiments of the present disclosure, the related contents are briefly explained.

A Non Terrestrial Network (NTN) provides communication service to terrestrial users by means of satellite communication. Compared with terrestrial cellular network communication, the satellite communication has many unique advantages. First of all, the satellite communication is not limited by the user's region. For example, general land communication cannot cover areas such as oceans, mountains, or deserts where communication devices cannot be set up or communication coverage is not done due to sparse population. For the satellite communication, because a satellite can cover a large area of the ground and the satellite can orbit around the earth, theoretically every corner of the earth can be covered by the satellite communication. Secondly, the satellite communication has high social value. The satellite communication can cover, at a lower cost, remote mountainous areas and poor and backward countries or regions, so that people in these areas can enjoy advanced voice communication and mobile internet technology, which is conducive to narrowing the digital divide with developed areas and promoting the development of these areas. Thirdly, the satellite communication has a long communication distance, and the increase of communication distance will not significantly increase the communication cost.

Finally, the satellite communication has high stability and is not limited by natural disasters.

Communication satellites are divided into Low-Earth Orbit (LEO) satellites, Medium-Earth Orbit (MEO) satellites, Geostationary Earth Orbit (GEO) satellites and High Elliptical Orbit (HEO) satellites according to different orbital altitudes. LEO and GEO are briefly described below.

The orbital altitude of LEO ranges from 500 km to 1500 km, and the corresponding orbital period is about 1.5 hours to 2 hours. The signal propagation delay of single hop communication between terminal devices is generally less than 20 ms. The maximum satellite visual time is 20 minutes. The signal propagation distance is short, the link loss is less, and the requirements for the transmit power of the terminal device is not high.

The orbital altitude of GEO is 35786 km, and the rotation period around the Earth is 24 hours. The signal propagation delay of single hop communication between terminal devices is generally 250 ms. In order to ensure the coverage of the satellite and improve the system capacity of the entire satellite communication system, the satellite covers the ground with multiple beams, and one satellite can form dozens or even hundreds of beams to cover the ground; and one satellite beam can cover the ground area with a diameter of tens to hundreds of kilometers.

In a 5G system, a flowchart of network registration, as shown in FIG. 1, includes operations 1 to 5.

In an operation 1, a UE initiates a registration process, and the UE sends a registration request to a Radio Access Network (RAN) through a Radio Resource Control (RRC) establishment complete message.

In an operation 2, the RAN sends an initial UE message to an Access and Mobility Management Function (AMF) entity. The initial UE message carries the registration request message and location information of the UE. The location information of the UE may include a Tracking Area Identity (TAI) and a Cell Global Identifier (CGI).

In an operation 3, the AMF entity accepts the registration process and sends a registration accept message to the UE. The registration accept message is carried in a DownLink (DL) Non-Access-Stratum (NAS) transport message. The AMF entity carries a 5G Global Unique Temporary UE Identity (5G-GUTI) in the registration accept message.

In an operation 4, the RAN sends the DL NAS transport message to the UE, and the DL NAS transport message carries the registration accept message.

In an operation 5, after the UE receives the registration accept message, the UE returns a registration complete message to the AMF entity to confirm that the 5G-GUTI has taken effect.

Figure 2:
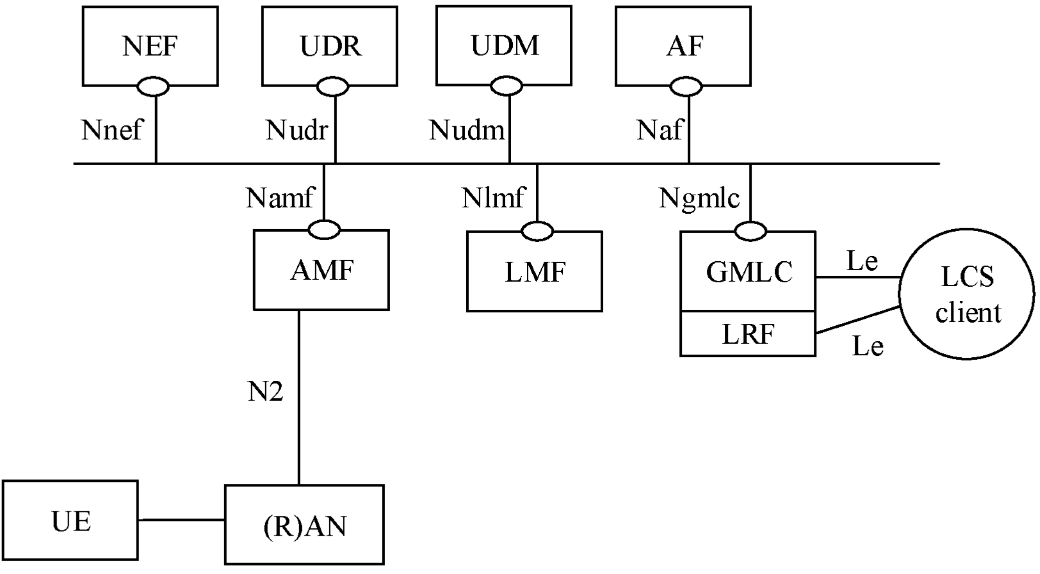
FIG. 2 is an architecture diagram of a location service in a 5G network according to an embodiment of the present disclosure.
Figure 3:
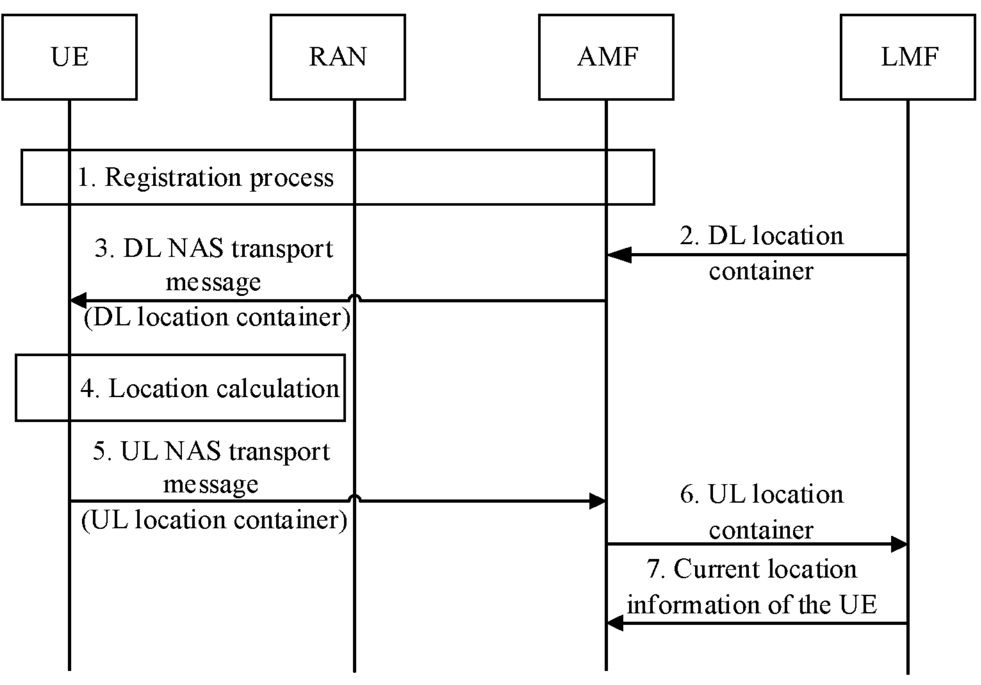
FIG. 3 is a diagram of determining location information of a UE based on the location service according to an embodiment of the present disclosure.

In a cellular network, since both the RAN and the AMF entity are located at the fixed locations, the AMF entity may learn the location information of the UE through the TAI or CGI in the initial UE message in the above operation 2. In the cellular network, an architecture diagram of a location service in a 5G network is shown in FIG. 2. In the 5G network, the location information of the UE is obtained by a Location Management Function (LMF) entity, which specifically includes: the LMF entity obtains the location information (mainly TAI or CGI) of the UE from the AMF entity, or the LMF entity obtains the location information from the UE; when an external Location Service (LCS) client needs to obtain the location information of the UE through a 3GPP network, the LCS client may request a Gateway Mobile Location Center (GMLC) to obtain the location information of the UE, and the GMLC obtains the location information of the UE from the AMF entity, and the AMF entity sends the location information obtained from the LMF to the LCS client through the GMLC. The determination of the location information of the UE based on the LCS is implemented after the registration is completed, as shown in FIG. 3, which includes operations 1 to 7.

In an operation 1, the UE initiates a registration process, where a registration request message carries a user Identity (ID) and a registration type; and the AMF entity carries a 5G-GUTI and a registration area in a registration accept message.

The registration process initiated by the UE includes the operations 1 to 5 as shown in FIG. 1.

In an operation 2, the LMF entity sends, to the AMF entity, a Namf_Communication_N1N2MessageTransfer message carrying an ID associated with the LCS and a DL location container, where the DL location container may carry location assistance information.

In an operation 3, the AMF entity sends a DL NAS transport (DL NAS TRANSPORT) message to the UE, where the DL NAS TRANSPORT message also carries the DL location container.

In an operation 4, the UE calculates the location of the UE based on the location assistance information in the operation 2.

In an operation 5, the UE returns an UpLink (UL) NAS transport (UL NAS TRANSPORT) message to the AMF entity, where the UL NAS TRANSPORT message carries a UL location container for carrying the location information of the UE.

In an operation 6, the AMF entity triggers a Namf_Communication_N1MessageNotify message carrying the UL location container.

In an operation 7, the LMF entity returns, to the AMF entity, a Nlmf_Location_DetermineLocation message carrying the current location information of the UE.

Figure 4:
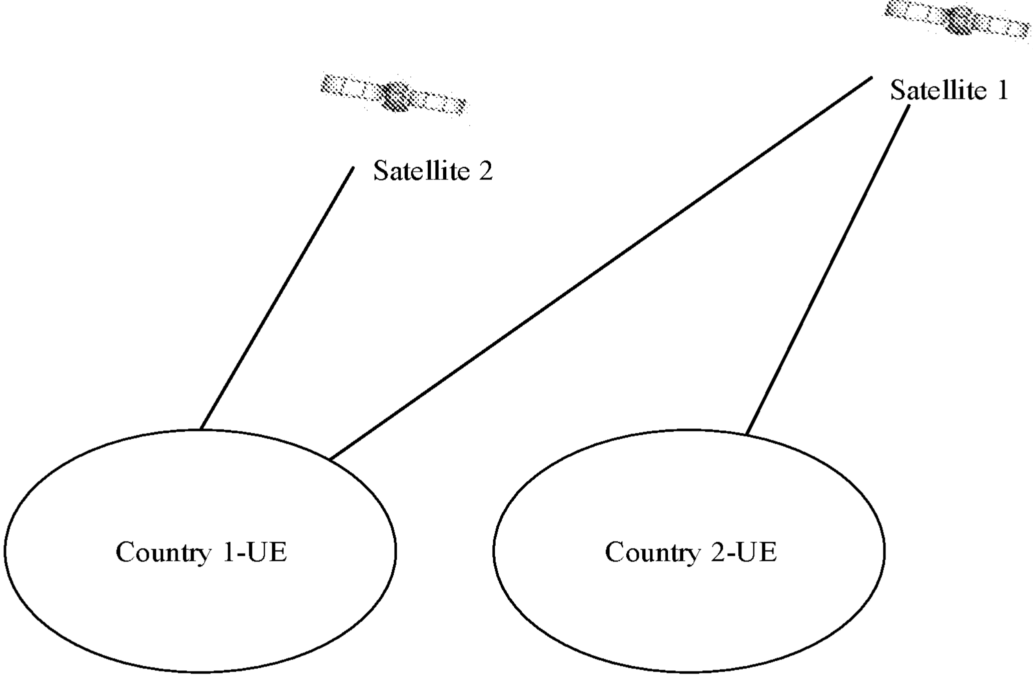
FIG. 4 is a diagram of coverage of satellite networks according to an embodiment of the present disclosure.

In satellite networks, due to the coverage of the satellites, a satellite network may cover multiple Countries. As shown in FIG. 4, a network corresponding to a satellite 1 may cover Countries 1 and 2, while a network corresponding to a satellite 2 only covers Country 1. When a terminal device is located in Country 1, the terminal device is located in the coverage areas of the satellite 1 and the satellite 2. However, there is a scenario where no ground receiving station, which is set up for the Satellite 1, in Country 1 provides service for the terminal device. In this scenario, if the terminal device selects a core network of Country 1, it will not meet the requirements of policy supervision and legal monitoring (if the terminal device is located in a certain country, the core network (such as the AMF entity) selected by the terminal device should be located in the certain country). Therefore, if the terminal device selects the core network of Country 1 and the core network selected by the terminal device is unable to provide service for the terminal device, the terminal device cannot access the correct network in time, for example, the terminal device cannot access a correct satellite Public Land Mobile Network (PLMN) in time.

The technical solutions of the embodiments of the disclosure may be applied to various communication systems, such as, a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolution system of the NR system, an LTE-based access to unlicensed spectrum (LTE-U) system, a NR-based access to unlicensed spectrum (NR-U) system, a universal mobile system Telecommunication system (UMTS), a worldwide interoperability for microwave access (WMAX) communication system, wireless local area networks (WLAN), a wireless fidelity (WiFi), a next generation communication system or other communication systems.

The system architectures and the service scenarios described in the embodiments of the disclosure are for more clearly explaining the technical solutions of the embodiments of the disclosure, but do not constitute a limitation to the technical solutions provided by the embodiments of the present disclosure. Those skilled in the art can appreciate that the technical solutions provided by the embodiments of the present disclosure are equally applicable to similar technical problems with the evolution of the network architectures and the emergence of new service scenarios.

A network device in the embodiments of the present disclosure may be an ordinary base station (such as NodeB, eNB or gNB), a new radio controller (NR controller), a centralized unit, a new radio base station, a radio remote module, a micro base station, a relay, a distributed unit, a transmission reception point (TRP), a transmission point (TP) or any other device. The specific technology and the specific device form adopted by the network device are not limited in the embodiments of the present disclosure. For convenience of description in all embodiments of the present disclosure, the above-mentioned apparatus/device configured to provide a wireless communication function for a terminal device is collectively referred to as a network device.

In the embodiments of the present disclosure, the terminal device may be any terminal, for example, the terminal device may be a user device for machine-like communication. That is to say, the terminal device may also be referred to as user equipment (UE), a mobile station (MS), a mobile terminal, a terminal, or the like. The terminal device may communicate with one or more core networks via a RAN. For example, the terminal device may be a mobile telephone (or "cellular" telephone), or a computer with a mobile terminal. For example, the terminal device may also be a portable mobile device, a pocket-sized mobile device, a hand-held mobile device, a computer-built mobile device or a vehicle-mounted mobile device that exchanges language and/or data with the RAN, which is not specifically limited in the embodiments of the present disclosure.

Optionally, the network device and the terminal device may be deployed on the land, including indoor or outdoor, hand-held or vehicle-mounted; or may be deployed on the water; or may be deployed on airplanes, balloons and artificial satellites in the air. The scenarios of the network device and the terminal device are not limited in the embodiments of the present disclosure.

Optionally, communications between a network device and a terminal device and between a terminal device and another terminal device may be performed through a licensed spectrum, an unlicensed spectrum, or both a licensed spectrum and an unlicensed spectrum. Communications between a network device and a terminal device and between a terminal device and another terminal device may be performed through a spectrum below 7 gigahertz (GHz) or above 7 GHz, or may be performed by simultaneously using a spectrum below 7 GHz and a spectrum above 7 GHz. The spectrum resources used between the network device and the terminal device are not limited in the embodiments of the present disclosure.

Generally speaking, conventional communication systems support a limited number of connections and the connections are easy to implement. However, with the development of communication technology, mobile communication systems will not only support conventional communication, but also support, for example, device to device (D2D) communication, machine to machine (M2M) communication, machine type communication (MTC), and vehicle to vehicle (V2V) communication. Embodiments of the present disclosure may also be applied to these communication systems.

Exemplarily, a communication system 100 to which the embodiments of the present disclosure are applied is shown in FIG. 5. The communication system 100 may include a network device 110, which may be a device communicating with a terminal device 120 (also referred to as a communication terminal, a terminal). The network device 110 may provide communication coverage for a specific geographic area and may communicate with a terminal device located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a wireless controller in a Cloud Radio Access Network (CRAN). Or, the network device may be a mobile switching center, a relay station, an access point, a vehicle-mounted device, a wearable device, a hub, a switch, a bridge, a router, a network-side device in a 5G network or a network device in a future evolved PLMN, or the like.

The communication system 100 also includes at least one terminal device 120 located within the coverage of the network device 110. The "terminal device " used herein includes, but is not limited to, a device that is configured to receive/transmit communication signals via a wired connection (such as a Public Switched Telephone Network (PSTN), a Digital Subscriber Line (DSL), a digital cable, direct cable connection), and/or via another data connection/network, and/or via a wireless interface with (such as a cellular network, a Wireless Local Area Network (WLAN), a Digital TV network such as a Digital Video Broadcasting Handheld (DVB-H) network, a satellite network, an Amplitude Modulation (AM)-Frequency Modulation (FM) broadcast transmitter), and/or via another terminal device; and/or an Internet of Things (IoT) device. A terminal device configured to communicate over a wireless interface may be called "a wireless communication terminal", "a wireless terminal" or "a mobile terminal". Examples of the mobile terminal may include, but are not limited to, a satellite or cellular phone; a personal communications system (PCS) terminal that may combine a cellular radio telephone with data processing, facsimile, and data communication capabilities; a Personal Digital Assistant (PDA) that may include a radiotelephone, a pager, an Internet/intranet access, a Web browser, a notebook, a calendar and/or a Global Positioning System (GPS) receiver; and a conventional laptop and/or palmtop receiver, or other electronic devices including radiotelephone transceivers. The terminal device may be an access terminal, User Equipment (UE), a user unit, a user station, a mobile station, a mobile platform, a remote station, a remote terminal, a mobile device, a user terminal, a terminal, a wireless communication device, a user proxy or a user device. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modem, a vehicle-amounted device, a wearable device, a terminal device in a 5G network, or a terminal device in a future evolved PLMN or the like.

Optionally, D2D communication may be performed between the terminal devices 120.

Optionally, the 5G system or 5G network may also be referred to as a NR system or an NR network.

FIG. 5 exemplarily shows one network device and two terminal devices.

Optionally, the communication system 100 may include multiple network devices and other numbers of terminal devices may be within the coverage of each network device, which is not limited in the embodiments of the present disclosure.

Optionally, the communication system 100 may also include other network entities such as a network controller, a mobility management entity and the like, which are not limited in the embodiments of the present disclosure.

It should be appreciated that a device having a communication function in a network/system in the embodiments of the present disclosure may be referred to as a communication device. Taking the communication system 100 shown in FIG. 5 as an example, the communication device may include a network device 110 and a terminal device 120 that have communication functions, and the network device 110 and the terminal device 120 may be the specific devices described above and will not be described herein. The communication device may also include other devices in the communication system 100, e.g., other network entities, such as the network controller, the mobility management entity and the like, which are not limited in the embodiments of the present disclosure.

A flowchart of an optional process of a network selection method applied to a UE provided by the embodiments of the present disclosure, as shown in FIG. 6, includes at least operations S201 to S203.

In an operation S201, the UE receives first information sent by a core network element, after the UE initiates a registration process for a first network.

In some embodiments, the first information includes area information of the UE. The area information of the UE may be a Mobile Country Code (MCC). The area information of the UE may also be an MCC and a Mobile Network Code (MNC).

In some embodiments, the operation that the UE initiates the registration process for the first network includes the following operation.

The UE sends a registration request message to the core network element, where the registration request message is used for requesting registration with the first network; and the UE sends location information of the UE to the core network element. The location information of the UE may be an actual physical address of the UE.

In some embodiments, after the UE initiates the registration process for the first network to the core network element (such as an AMF entity), if the core network element determines, based on the location information of the UE, that the first network with which the UE requests registration is unable to provide service for the UE, the core network element sends the first information at least including the MCC to the UE.

The first network is unable to provide the service for the UE, which may refer to that no ground receiving station, which is set up for a satellite corresponding to the first network, in a Country where the UE belongs provides the service for the UE.

In some optional embodiments, the first information is carried in a Deregistration Request message.

If the first information is carried in the Deregistration Request message, the UE may also send a Deregistration Accept message to the core network element.

In some optional embodiments, the first information is carried in a UE configuration command (UE CONFIGURATION COMMAND) message.

If the first information is carried in the UE CONFIGURATION COMMAND message, the UE can also send a UE configuration complete (UE CONFIGURATION COMPLETE) message to the core network element.

In an operation S202, the UE determines a target network based on the first information.

In some embodiments, if the first information includes the MCC, the UE re-determines a target network to be registered based on the MCC.

In some embodiments, if the first information includes the MCC and the MNC, the UE re-determines a target network to be registered based on the MCC and the MNC.

Herein, the target network to be registered is a network that is able to provide the service for the UE, such as a PLMN for a satellite network.

In some embodiments, the network selection method may further include an operation S203.

In the operation S203, the UE registers with the target network.

In some embodiments, the UE initiates a registration process for the target network after the UE determines the target network based on the MCC or based on the MCC and the MNC.

A flowchart of an optional process of a network selection method applied to a core network element provided by the embodiments of the disclosure, as shown in FIG. 7, includes at least operations S301 to S302.

In an operation S301, the core network element sends first information to a UE in a case that a first network with which the UE requests registration is unable to provide service for the UE.

In some embodiments, after the UE initiates a registration process for the first network, if the core network element determines, based on location information of the UE, that the first network is unable to provide the service for the UE, the core network element sends the first information to the UE. The first information includes area information of the UE, and the first information is used for the UE to register with a target network.

Herein, the first network is unable to provide the service for the UE, which may refers to that no ground receiving station, which is set up for the satellite corresponding to the first network, in a Country where the UE belongs provides the service for the UE.

In some embodiments, the first information includes the area information of the UE. The area information of the UE may be an MCC. The area information of the UE may also be an MCC and an MNC.

In some optional embodiments, the first information is carried in a Deregistration Request message.

If the first information is carried in the Deregistration Request message, the core network element may also receive a Deregistration Accept message sent by the UE.

In some optional embodiments, the first information is carried in a UE CONFIGURATION COMMAND message.

If the first information is carried in the UE CONFIGURATION COMMAND message, the core network element may also receive a UE configuration complete (UE CONFIGURATION COMPLETE) message sent by the UE.

In some optional embodiments, the method may further include an operation S302.

In the operation S302, the core network element receives a registration request message sent by the UE, where the registration request message is used for the UE to request registration with the target network.

In some embodiments, the target network may include a satellite PLMN.

It should be noted that in the embodiment of the present disclosure, the core network element may be an AMF entity.

Figure 8:
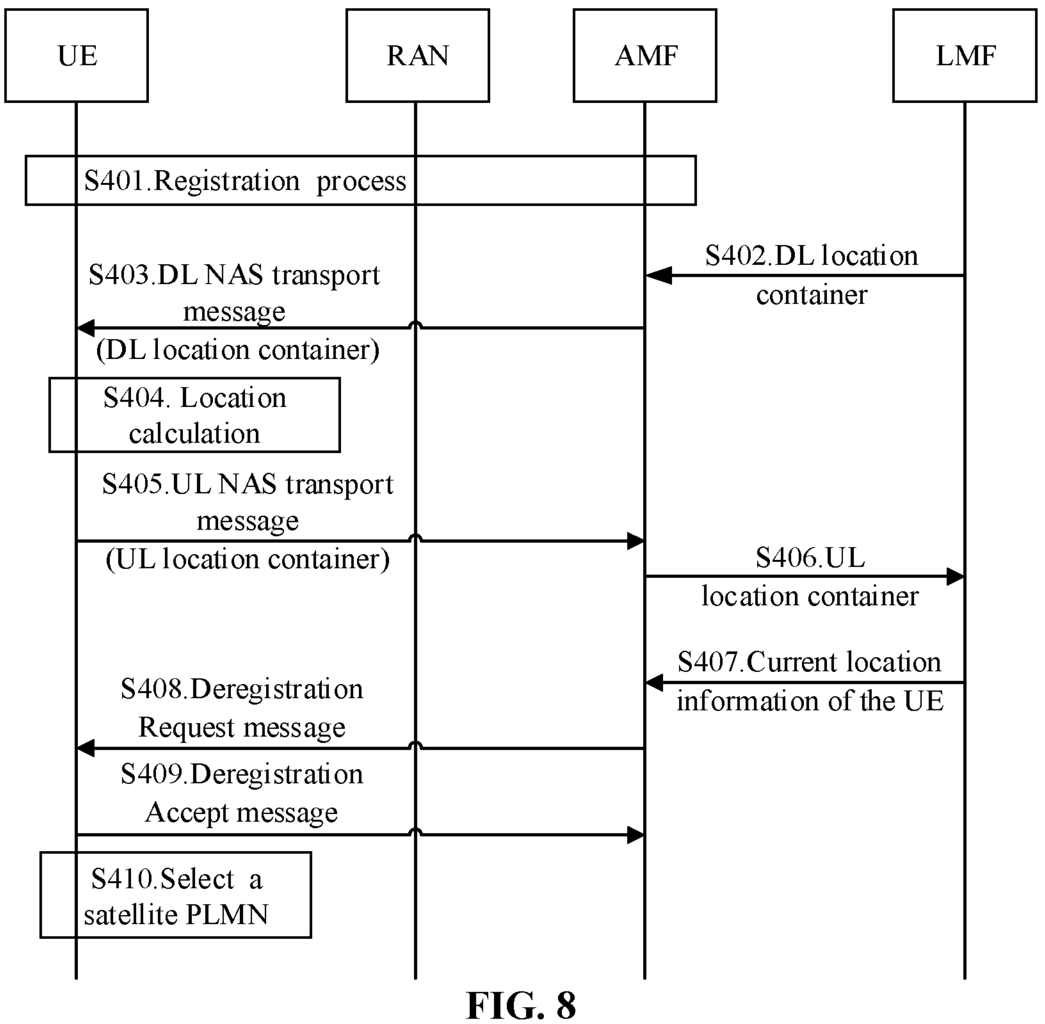
FIG. 8 is a flowchart of a detailed process of a network selection method according to an embodiment of the disclosure.

A flowchart of a detailed optional process of a network selection method provided by the embodiments of the present disclosure, as shown in FIG. 8, includes at least operations S401 to S410.

In an operation S401, a UE initiates a registration process for a first network.

In some embodiments, the UE sends a registration request message to an AMF entity, where the registration request message carries a user ID and a registration type; and the AMF entity sends a registration accept message to the UE, where the registration accept message carries a 5G-GUTI and a registration area.

In an operation S402, an LMF entity sends a Namf_Communication_N1N2MessageTransfer message to the AMF entity, where the Namf_Communication_N1N2MessageTransfer message carries an ID associated with an LCS and a DL location container, and the DL location container may carry location assistance information.

In an operation S403, the AMF entity sends a DL NAS TRANSPORT message to the UE.

In some embodiments, the DL NAS TRANSPORT message carries the DL location container.

In an operation S404, the UE calculates location information of the UE based on the location assistance information.

In some embodiments, the location information of the UE may be an actual physical location of the UE.

In an operation S405, the UE returns a UL NAS TRANSPORT message to the AMF entity.

In some embodiments, the UL NAS TRANSPORT message carries a UL location container for carrying the location information of the UE.

In an operation S406, the AMF entity triggers a Namf_Communication_N1MessageNotify message.

In some embodiments, the Namf_Communication_N1MessageNotify message carries the UL location container.

In an operation S407, the LMF entity returns a Nlmf_Location_DetermineLocation message to the AMF entity.

In some embodiments, the Nlmf_Location_DetermineLocation message carries the location information of the UE.

In some embodiments, the LMF entity parses the location information in the UL location container to obtain the location information of the UE, and sends the location information of the UE to the AMF entity through the Nlmf_Location_DetermineLocation message.

In an operation S408, if the AMF entity determines, based on the location information of the UE, that the UE does not select a correct satellite PLMN, the AMF entity initiates a Deregistration process where the AMF sends a Deregistration Request message to the UE.

The UE does not select the correct satellite PLMN, which may refer to that no ground receiving station, which is set up for the satellite, in a Country where the UE belongs provides service for the UE.

In some embodiments, the Deregistration Request message carries an MCC, or the Deregistration Request message carries an MCC and an MNC.

In an operation S409, the UE returns a Deregistration Accept message to the AMF entity.

In an operation S410, the UE selects a satellite PLMN based on the MCC or based on the MCC and the MNC.

Figure 9:
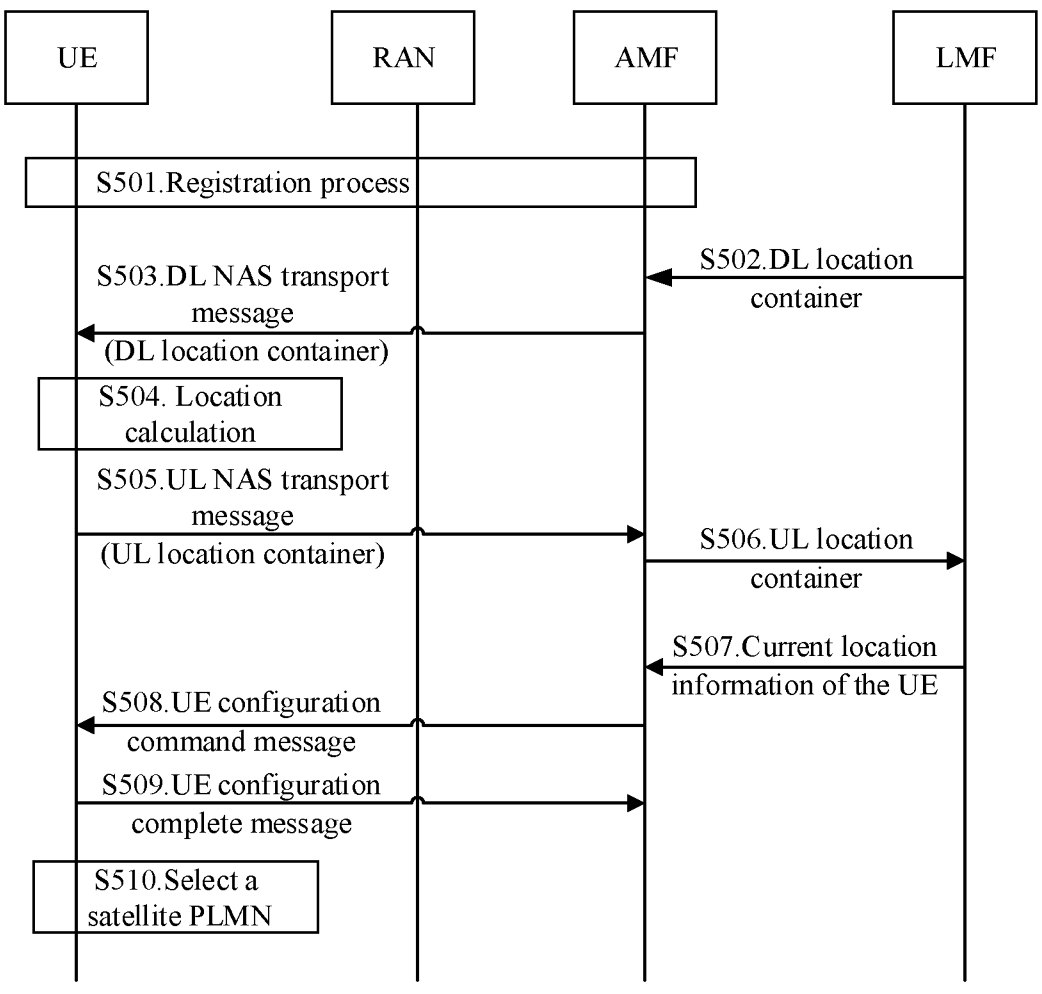
FIG. 9 is a flowchart of another detailed process of a network selection method according to an embodiment of the present disclosure.

A flowchart of a detailed optional process of a network selection method provided by the embodiments of the present disclosure, as shown in FIG. 9, includes at least operations S501 to S510.

In an operation S501, a UE initiates a registration process for a first network.

In some embodiments, the UE sends a registration request message to an AMF entity, where the registration request message carries a user ID and a registration type; and the AMF entity sends a registration accept message to the UE, where the registration accept message carries a 5G-GUTI and a registration area.

In an operation S502, an LMF entity sends a Namf_Communication_N1N2MessageTransfer message to the AMF entity, where the Namf_Communication_N1N2MessageTransfer message carries an ID associated with an LCS and a DL location container, and the DL location container may carry location assistance information.

In an operation S503, the AMF entity sends a DL NAS TRANSPORT message to the UE.

In some embodiments, the DL NAS TRANSPORT message carries the DL location container.

In an operation S504, the UE calculates location information of the UE based on the location assistance information.

In some embodiments, the location information of the UE may be an actual physical location of the UE.

In an operation S505, the UE returns a UL NAS TRANSPORT message to the AMF entity.

In some embodiments, the UL NAS TRANSPORT message carries a UL location container for carrying the location information of the UE.

In an operation S506, the AMF entity triggers a Namf_Communication_N1MessageNotify message.

In some embodiments, the Namf_Communication_N1MessageNotify message carries the UL location container.

In an operation S507, the LMF entity returns a Nlmf_Location_DetermineLocation message to the AMF entity.

In some embodiments, the Nlmf_Location_DetermineLocation message carries the location information of the UE.

In some embodiments, the LMF entity parses the location information in the UL location container to obtain the location information of the UE, and sends the location information of the UE to the AMF entity through the Nlmf_Location_DetermineLocation message.

In an operation S508, if the AMF entity determines, based on the location information of the UE, that the UE does not select a correct satellite PLMN, the AMF entity sends a UE CONFIGURATION COMMAND message to the UE.

In some embodiments, the UE CONFIGURATION COMMAND message carries an MCC, or the UE CONFIGURATION COMMAND message carries an MCC and an MNC.

The UE does not select the correct satellite PLMN, which may refer to that no ground receiving station, which is set up for the satellite, in a Country where the UE belongs provides service for the UE.

In an operation S509, the UE returns a UE CONFIGURATION COMPLETE message to the AMF entity.

In an operation S510, the UE selects a satellite PLMN based on the MCC or based on the MCC and the MNC.

According to the embodiments of that present disclosure, in a case that the core network element (such as the AMF entity) determines, based on the location information of the UE, that the network with which the UE requests registration is unable to provide service for the UE, for example, no ground receiving station, which is set up for the satellite corresponding to the network requested by the UE, in the Country where the UE belongs provides the service for the UE, the core network element sends the MCC or the MCC and the MNC to the UE through the UE CONFIGURATION COMMAND message or the Deregistration Request message, so that the UE selects the correct satellite PLMN for registration based on the MCC or the MCC and the MNC, which achieves that the UE quickly accesses the effective satellite PLMN.

Figure 10:
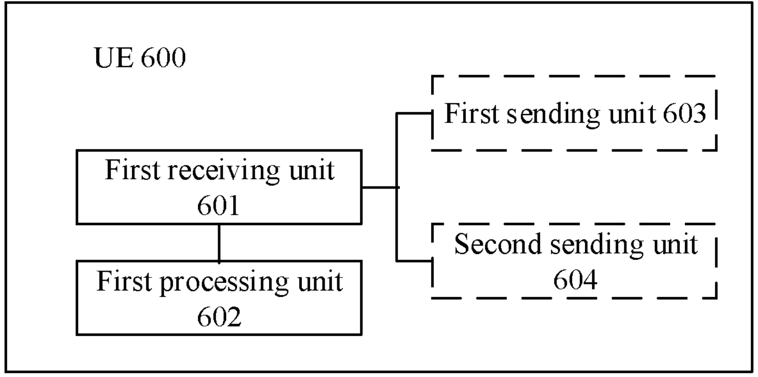
FIG. 10 is a diagram of an optional composition structure of a UE according to an embodiment of the present disclosure.

In order to implement the abovementioned network selection methods, the embodiments of the present disclosure also provide a UE. A diagram of an optional composition structure of the UE 600 is shown as FIG. 10. The UE includes a first receiving unit 601 and a first processing unit 602.

The first receiving unit 601 is configured to receive first information sent by a core network element; where the first information includes area information of the UE.

The first processing unit 602 is configured to determine a target network based on the first information.

In some embodiments, the area information of the UE includes an MCC.

In some embodiments, the first information further includes an MNC.

In some embodiments, the first information is carried in a deregistration request message.

In some embodiments, the UE 600 further includes a first sending unit 603 configured to send a deregistration accept message.

In some embodiments, the first information is carried in a UE configuration command message.

In some embodiments, the UE 600 further includes a second sending unit 604.

The second sending unit 604 is configured to send a UE configuration complete message.

In some embodiments, the first processing unit 602 is configured to send a registration request message to the core network element, where the registration request message requests registration with a first network; and send location information of the UE to the core network element.

In some embodiments the first processing unit 602 is further configured to register with the target network.

In some embodiments, the target network includes a satellite PLMN.

In some embodiments, the core network element includes an AMF entity.

Figure 11:
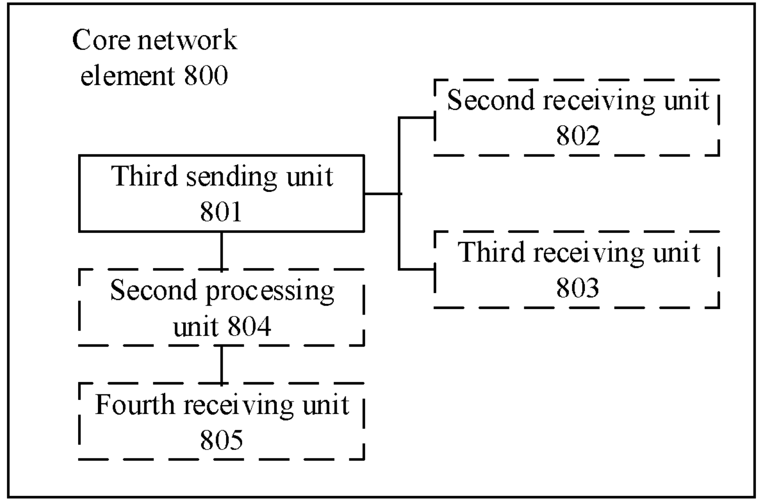
FIG. 11 is a diagram of an optional composition structure of a core network element according to an embodiment of the disclosure.

In order to implement the abovementioned network selection method, the embodiments of the present disclosure also provide a core network element. A diagram of another optional composition structure of the core network element 800 is shown as FIG. 11. The core network element 800 includes a third sending unit 801.

The third sending unit 801 configured to send first information to a UE in a case that a first network with which the UE requests registration is unable to provide service for the UE.

The first information includes area information of the UE, and the first information is used for the UE to register with a target network.

In some embodiments, the area information of the UE includes an MCC.

In some embodiments, the first information further includes an MNC.

In some embodiments, the first information is carried in a deregistration request message.

In some embodiments, the core network element 800 further includes a second receiving unit 802 configured to receive a deregistration accept message.

In some embodiments, the first information is carried in a UE configuration command message.

In some embodiments, the core network element 800 further includes a third receiving unit 803.

The third receiving unit 803 is configured to receive a UE configuration complete message.

In some embodiments, the core network element 800 further includes a second processing unit 804.

The second processing unit 804 is configured to determine, based on location information of the UE, that the first network is unable to provide the service for the UE.

In some embodiments, the core network element 800 further includes a fourth receiving unit 805.

The fourth receiving unit 805 is configured to receive a registration request message sent by the UE, where the registration request message is used for the UE to request registration with the target network.

In some embodiments, the target network includes a satellite PLMN.

In some embodiments, the core network element 800 includes an AMF entity.

The embodiments of the present disclosure also provide a UE, including a processor and a memory for storing computer programs executable on the processor, where the processor is configured to execute the computer programs to perform the operations of the abovementioned network selection method performed by the UE.

The embodiments of the present disclosure also provide a core network element, including a processor and a memory for storing computer programs executable on the processor, where the processor is configured to execute the computer programs to perform the operations of the abovementioned network selection method performed by the core network element.

The embodiments of the present disclosure also provide a chip including a processor configured to call computer programs from a memory and run the computer programs, to enable a device equipped with the chip to perform the abovementioned network selection method performed by the UE.

The embodiments of the present disclosure also provide a chip including a processor configured to call computer programs from a memory and run the computer programs, to enable a device equipped with the chip to perform the abovementioned network selection method performed by the core network element.

The embodiments of the present disclosure also provide a storage medium having executable programs thereon that, when executed by a processor, cause the processor to performed the abovementioned network selection method performed by the UE.

The embodiments of the present disclosure also provide a storage medium having executable programs thereon that, when executed by a processor, cause the processor to perform the abovementioned network selection method performed by the core network element.

The embodiments of the present disclosure also provide a computer program product including computer program instructions that, when executed, cause a computer to perform the abovementioned network selection method performed by the UE.

The embodiments of the present disclosure also provide a computer program product including computer program instructions that, when executed, cause a computer to perform the abovementioned network selection method performed by the core network element.

The embodiments of the present disclosure also provide a computer program causing a computer to perform the abovementioned network selection method performed by the UE.

The embodiments of the disclosure also provide a computer program causing a computer to perform the abovementioned network selection method performed by the core network element.

Figure 12:
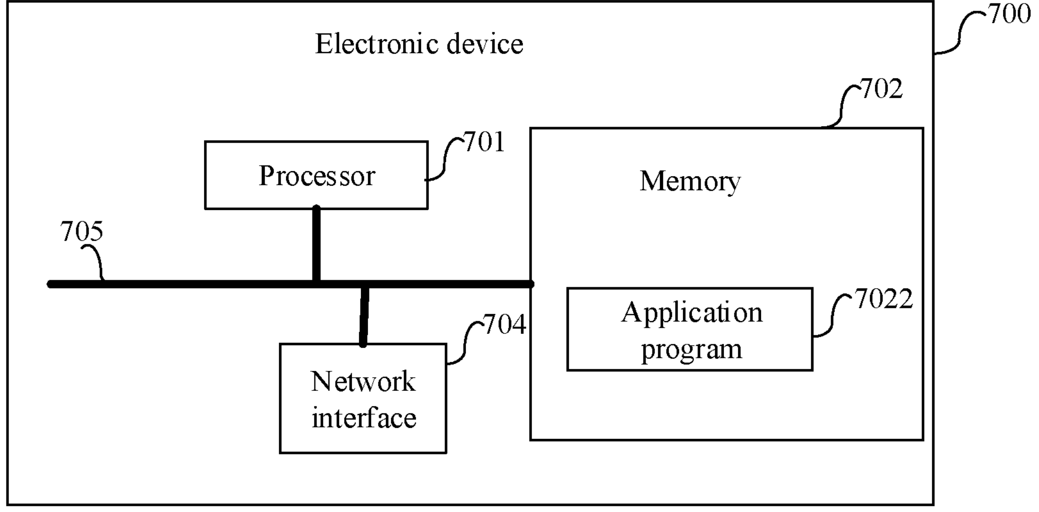
FIG. 12 is a structural diagram of a hardware composition of an electronic device according to an embodiment of the present disclosure.

FIG. 12 is a structural diagram of a hardware composition of an electronic device (the UE or the core network element) according to an embodiment of the present disclosure. The electronic device 700 includes at least one processor 701, a memory 702 and at least one network interface 704. The various components in the electronic device 700 are coupled together by a bus system 705. It can be appreciated that the bus system 705 is used for performing connection communication between these components. The bus system 705 includes a power bus, a control bus and a status signal bus in addition to a data bus. However, for clarity, the various buses are designated as the bus system 705 in FIG. 12.

It will be appreciated that the memory 702 may be volatile or non-volatile memory, or may include both volatile and non-volatile memories. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, an optical disc, or an Compact Disc Read-Only Memory (CD-ROM). The magnetic surface memory may be a magnetic disk memory or a magnetic tape memory. The volatile memory may be a Random Access Memory (RAM) that functions as an external cache. By way of example, but not limitation, many forms of RAMs may be used, such as a Static Random Access Memory (SRAMs), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memories 702 described in the embodiments of the present disclosure are intended to include, but are not limited to, these and any other suitable types of memories.

The memory 702 in the embodiments of the present disclosure is used for storing various types of data to support the operations of the electronic device 700. Examples of such data include any computer program for operation on the electronic device 700, such as an application program 7022. The programs for implementing the methods in the embodiments of the present disclosure may be included in the application program 7022.

The methods disclosed in the embodiments of the present disclosure may be applied to, or performed by, the processor 701. The processor 701 may be an integrated circuit chip having signal processing capabilities. In an implementation, the operations of the abovementioned methods may be performed by an integrated logic circuitry of the hardware in the processor 701 or instructions in the form of software. The processor 701 may be a general purpose processor, a Digital Signal Processor (DSP), or other programmable logic devices, a discrete gate or a transistor logic device, a discrete hardware component, or the like. The processor 701 may implement or perform the methods, operations, and logical block diagrams disclosed in the embodiments of the present disclosure. The general purpose processor may be a microprocessor or any conventional processor or the like. The operations of the methods disclosed in the embodiments of the present disclosure may be directly performed by a hardware decoding processor, or may be performed by a combination of hardware and software modules in the decoding processor. The software modules may be located in a storage medium located in the memory 702. The processor 701 reads information from the memory 702 and performs the operations of the abovementioned methods in combination with the hardware in the processor.

In an exemplary embodiment, the electronic device 700 may be implemented by one or more application specific integrated circuits (ASICs), DSPs, Programmable Logic Devices (PLDs), Complex Programmable Logic Devices (CPLDs), Field Programmable Gate Arrays (FPGAs), general purpose processors, controllers, Micro Controller Units (MCUs), Micro Processor units (MPUs), or other electronic components; and may be configured to perform the abovementioned methods.

The present disclosure is described with reference to flowcharts and/or block diagrams of methods, devices (systems), and computer program products of the embodiments of the present disclosure. It should be understood that computer program instructions are configured to implement each flow and/or block in the flowcharts and/or block diagrams, and the combination of flows/blocks in the flowcharts and/or block diagrams. These computer program instructions may be provided to a general purpose computer, a special computer, an embedded processor or processors of other programmable data processing devices to generate a machine, such that an apparatus for implementing the functions specified in one or more flow in the flowcharts and/or one or more blocks in the block diagrams is generated through the instructions executed by the computer or the processor of other programmable data processing devices.

These computer program instructions may also be stored in a computer readable memory that may direct the computer or other programmable data processing devices to work in a particular manner, such that the instructions stored in the computer readable memory generates a manufacture including an instruction apparatus configured to implement the functions specified in one or more flows in the flowcharts and/or one or more blocks in the block diagrams.

These computer program instructions may also be loaded in a computer or other programmable data processing devices such that a series of operations are executed on the computer or other programmable data processing devices to generate computer-implemented processes, and thus the instructions executed on the computer or other programmable data processing devices provide the operations for implementing the functions specified in one or more flows in the flowcharts and/or one or more blocks in the block diagrams.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

The above is only the preferred embodiments of the disclosure and not intended to limit the scope of protection of the disclosure. Any variations, equivalent replacement and improvement made within the spirit and principles of the disclosure shall fall within the scope of protection of the disclosure.

The invention claimed is:

1. A network selection method, comprising:

initiating, by User Equipment (UE), a registration process for a first network;

receiving, by the UE, first information sent by a core network element in a case that the first network with which the UE requests registration is unable to provide service for the UE, wherein the core network element comprises an Access and Mobility Management Function (AMF) entity, the first information is carried in a deregistration request message in a deregistration process initiated by the core network element, and the first information comprises area information of the UE; and re-determining, by the UE, a target network based on the first information, wherein the case that the first network with which the UE requests registration is unable to provide service for the UE is determined based on current location information of the UE, and the current location information of the UE is received by the core network element in a Nlmf_Location_DetermineLocation message from a Location Management Function (LMF) entity, after sending a Namf_Communication_N1MessageNotify message to the LMF entity, wherein the Namf_Communication_N1MessageNotify message carries the current location information of the UE determined by the UE.

2. The method of claim 1, wherein the area information of the UE comprises:

a Mobile Country Code (MCC).

3. The method of claim 1, wherein re-determining, by the UE, the target network based on the first information comprises:

re-determining, by the UE, the target network based on the area information of the UE in the first information.

4. The method of claim 1, further comprising:

sending, by the UE, a deregistration accept message to the core network element.

5. The method of claim 1, wherein the target network comprises:

a Public Land Mobile Network (PLMN).

6. A network selection method, comprising:

after a registration process for a first network is initiated by User Equipment (UE), sending, by a core network element, first information to the UE in a case that the first network with which the UE requests registration is unable to provide service for the UE, wherein the core network element comprises an Access and Mobility Management Function (AMF) entity the first information is carried in a deregistration request message in a deregistration process initiated by the core network element, wherein the first information comprises area information of the UE, and the first information is used for the UE to re-determine a target network and register with the target network, wherein the method further comprises:

sending, by the core network element, a Namf_Communication_N1MessageNotify to a Location Management Function (LMF) entity, wherein the message Namf_Communication_N1MessageNotify message carries current location information of the UE determined by the UE;

receiving, by the core network element, a Nlmf_Location_DetermineLocation message from the LMF entity, wherein the Nlmf_Location_DetermineLocation message carries the current location information of the UE; and determining, by the core network element, based on current location information of the UE, that the first network is unable to provide the service for the UE.

7. The method of claim 6, wherein the area information of the UE comprises:

a Mobile Country Code (MCC).

8. The method of claim 6, further comprising:

receiving, by the core network element, a deregistration accept message sent by the UE.

9. The method of claim 6, wherein the target network comprises:

a Public Land Mobile Network (PLMN).

10. User Equipment (UE), comprising:

a processor;

a network interface; and a memory for storing computer programs that, when executed by the processor, cause the processor to:

initiate a registration process for a first network;

receive, through the network interface, first information sent by a core network element in a case that the first network with which the UE requests registration is unable to provide service for the UE, wherein the core network element comprises an Access and Mobility Management Function (AMF) entity, the first information is carried in a deregistration request message in a deregistration process initiated by the core network element, and the first information comprises area information of the UE; and re-determine a target network based on the first information, wherein the case that the first network with which the UE requests registration is unable to provide service for the UE is determined based on current location information of the UE, and the current location information of the UE is received by the core network element in a Nlmf_Location_DetermineLocation message from a Location Management Function (LMF) entity, after sending a Namf_Communication_N1MessageNotify message to the LMF entity, wherein the Namf_Communication_N1MessageNotify message carries the current location information of the UE determined by the UE.

11. The UE of claim 10, wherein the area information of the UE comprises:

a Mobile Country Code (MCC).

12. The UE of claim 10, wherein the processor is configured to re-determine the target network based on the area information of the UE in the first information.

13. The UE of claim 10, wherein the case that the first network with which the UE requests registration is unable to provide service for the UE comprises: the core network selected by the UE is unable to provide the service for the UE.

14. The UE of claim 10, wherein the processor is further configured to send a deregistration accept message to the core network element.

15. The UE of claim 10, wherein the target network comprises:

a Public Land Mobile Network (PLMN).

16. A core network element, the core network element being an Access and Mobility Management Function (AMF) entity, comprising:

a processor;

a network interface; and a memory for storing computer programs that, when executed by the processor, cause the processor to:

after a registration process for a first network is initiated by User Equipment (UE), send, through the network interface, first information to the UE in a case that the first network with which the UE requests registration is unable to provide service for the UE, wherein the first information is carried in a deregistration request message in a deregistration process initiated by the core network element, wherein the first information comprises area information of the UE, and the first information is used for the UE to re-determine a target network and register with the target network, wherein the processor is further configured to:

send, through the network interface, a Namf_Communication_N1MessageNotify message to a Location Management Function (LMF) entity, wherein the Namf_Communication_N1MessageNotify message carries current location information of the UE determined by the UE;

receive, through the network interface, a Nlmf_Location_DetermineLocation message from the LMF entity, wherein the Nlmf_Location_DetermineLocation message carries the current location information of the UE; and determine, based on current location information of the UE, that the first network is unable to provide the service for the UE.

17. The core network element of claim 16, wherein the area information of the UE comprises:

a Mobile Country Code (MCC).

18. The core network element of claim 16, wherein the case that the first network with which the UE requests registration is unable to provide service for the UE comprises: the core network selected by the UE is unable to provide the service for the UE.

19. The core network element of claim 16, wherein the processor is further configured to receive a deregistration accept message by the UE.

20. The UE of claim 16, wherein the target network comprises:

a Public Land Mobile Network (PLMN).

* * * * *